F. SMITH.
AIRPLANE LANDING AND LAUNCHING EQUIPMENT.
APPLICATION FILED OCT. 9, 1917.
1,306,860.
Patented June 17, 1919.
2 SHEETS—SHEET 2.
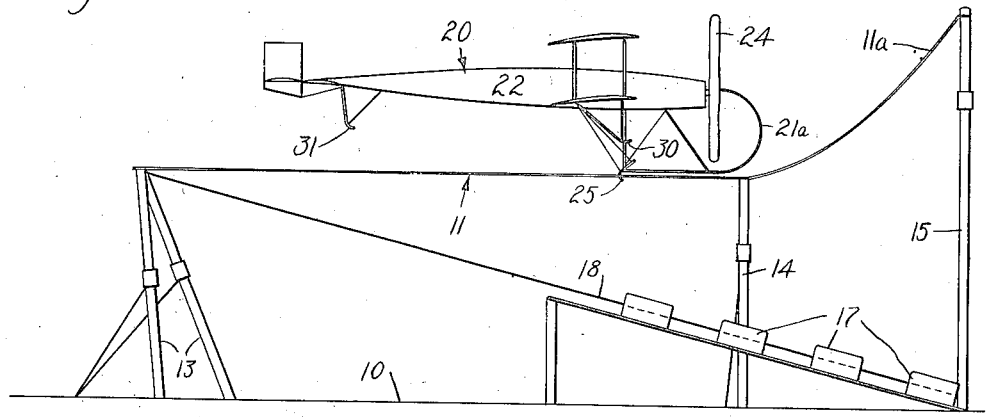
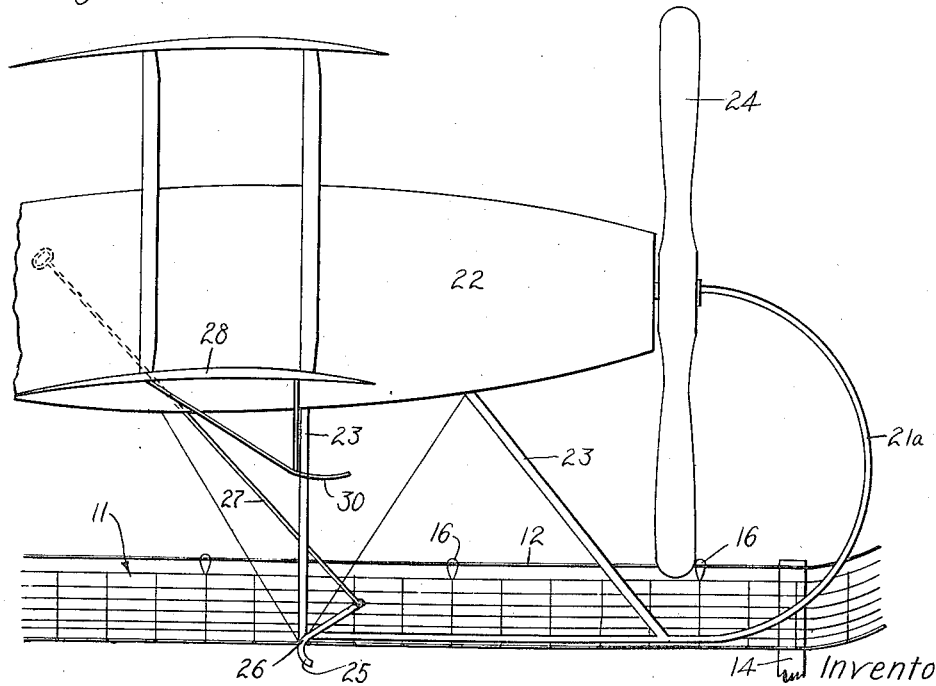

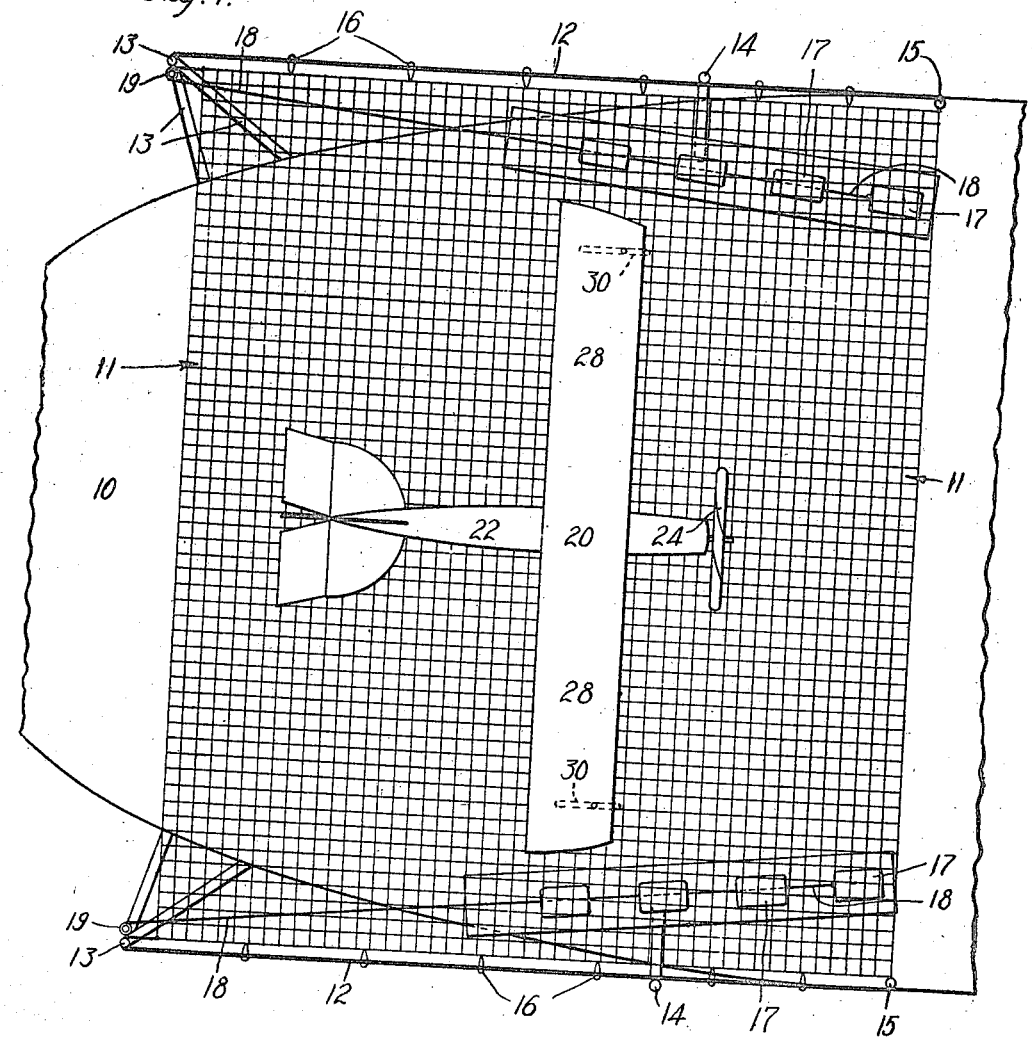

UNITED STATES PATENT OFFICE.

FLOYD SMITH, OF SAN DIEGO, CALIFORNIA.

AIRPLANE LANDING AND LAUNCHING EQUIPMENT.

1,306,860.  Specification of Letters Patent.  Patented June 17, 1919.

Application filed October 9, 1917. Serial No. 195,537.

*To all whom it may concern:*

Be it known that I, FLOYD SMITH, a citizen of the United States, residing at San Diego, in the county of San Diego, State of California, have invented new and useful Improvements in Airplane Landing and Launching Equipments, of which the following is a specification.

This invention relates to means for landing, and also for launching, airplanes; and particularly relates to the landing of airplanes within as small a space as is necessary in landing an airplane upon a ship; and it is an object of this invention to provide a practical and efficient means whereby an airplane may be landed on ship-board.

It is an object of this invention to make possible the use of light fast airplanes for naval service. In the past it has been the general practice to use for naval service that type of air craft known as the seaplane—an airplane equipped with pontoons, etc., and necessarily heavy and having a low speed of flight. These heavy slow airplanes are not able to compete in efficiency with the light land battle planes now in use; and it is an object of my invention to make such provisions as to make possible the use of light and fast airplanes for naval purposes.

I accomplish these objects by providing a means for effectively and safely landing upon the deck of the vessel an airplane which is not equipped with any of the usual land or water landing means, but which is only equipped with a very light, but very effective, landing means. The feature of my invention, for landing the airplane, comprises the use of a flexible landing net, or the like, which is supported at its edges and into which the airplane alights, the net being yielding and resilient. This landing net is preferably made so that it will move with the airplane longitudinally; and I provide means for retarding or resisting the movement of the landing net, so as to bring the airplane quickly, but without any sudden jar, to a stop. The airplane is equipped with suitable means for engaging or catching in the net; said means being preferably in the form of hook-shaped skids, or hooks; and these means are so shaped that they may also form skids upon which the airplane may be launched by a catapult device of any of the ordinary kinds, except that the catapult for such an airplane as I propose need not be so strong and heavy as is usually the case, as my airplane is particularly light.

The invention will be best understood by reference to the following specification wherein I explain in detail a preferred arrangement and combination of preferred specific formations of parts; reference being had for this purpose to the accompanying drawings in which—

Figure 1 is a plan showing my landing arrangement; Fig. 2 is a vertical longitudinal section; and Fig. 3 is a side elevation of the forward part of an airplane equipped with my landing devices.

In the drawings I illustrate a boat deck at 10, upon which my landing device may be mounted. I provide a suitable landing net 11 which may be made of any suitable flexible material or element; but I prefer to make this in the form of an open mesh rope net strong enough to withstand any stress liable to be imposed upon it and strong enough to efficiently catch and hold and stop the airplane alighting in it. This net is stretched between cables 12 which are themselves stretched between supporting posts 13, 14, and 15, mounted upon the deck. These posts may preferably be slanted outwardly and may be tied or guyed down in any suitable manner. This construction and arrangement makes a resilient structure; one which gives and yields to the weight or impact of an airplane. The net itself is flexible and resilient and is resiliently stretched between the stretched side cables 12. The tension at which the net is stretched may be varied; it need not be necessarily sufficient to keep the net taut and flat. The end posts 15 may be higher than the other posts 13 and 14, so that one end of the net 11 is held higher than the other part of the net, as is best illustrated in Fig. 2. The net itself is mounted upon the cables 12 by means of loops or rings, as shown at 16, so that the net is preferably movable longitudinally by sliding upon the cables 12. This longitudinal movement of the net is opposed by any suitable yielding resistance means, as by drag weights 17 attached to cables 18 which pass over pulleys 19 and are attached to the end corners of the net. One weight may be attached to the end of cable 18; the others may be strung loosely on the cable and spaced apart so as to be picked up at intervals as the cable moves; to gradually increase the resistance to movement of the net and bring the airplane to a quick but easy stop. When an air plane lights in the net and tends to move the net longitudinally, in the direction of flight of the airplane, the drag-weights 17 resist and oppose the movement of the net and thus assist in bringing the airplane to a stop.

According to my invention I am able to make the airplane 20 of light, fast type, because I do not have to encumber it with heavy landing skids or pontoons or the like. Instead of any of these usual landing or floating devices, I merely equip my airplane with suitable means to enable it to land in the net 11. It will be understood, of course, that any ordinary airplane can land in the net, without special equipment. I may provide a central skid 21 under the forward part of the body 22; and this skid I curve upwardly and forwardly at 21$^a$ in front of the propeller 24 to protect the propeller against striking the net 11. This skid may be attached to the body 22 in any suitable manner, as by frames 23. At the rear of skid 21 I may provide a pivoted grab hook 25 pivoted at 26 and adapted to be thrown to the position shown in Fig. 3 so that, when in this position, it will catch in the meshes of net 11. This pivoted hook may be operated and controlled by means of a wire or rod 27 which extends up into the body. When not in use, or when the airplane is being launched, the hook may be moved around in the direction indicated by the arrow in Fig. 3, so that the hook portion will not project below the skid 21. I also provide the wings 28, on each side of the body, with hook skids 30 which may also be adapted to catch in the meshes of the net, but which may be so shaped (curved upwardly) at their forward ends that they will act as skids and will not catch on launching rails, etc. Also, I may mount a similar hooked skid at 31 beneath the after part of the body, the hook being so shaped that it will catch in the meshes of net 11, but will act as a skid when the airplane is being launched. It will be seen that these landing devices which I place upon the airplane are extremely simple and exceptionally light; being not even as heavy as the usual landing means used on light, fast land planes. Equipped with my devices, the airplane can be launched by the usual hydraulic or compressed air system now in use.

In landing, it will be noted that the flexibility and resilient action of the net take up a great deal of the shock of landing. The upward inclined end portion of the net at 11$^a$ increases the safety of alighting and decreases the chance that the aviator may miss the net by skimming over it. When once in the net, further forward movement of the airplane is checked by the drag-weights which resist forward movement of the net, and quickly, but easily, bring the airplane to a stop. It will be understood that it may not be necessary in all cases to have the airplane equipped with hooks; any ordinary airplane can land in the net and the shock of landing be absorbed by the flexibilty and resiliency of the net, even if the net does not move longitudinally or horizontally with the airplane. In fact, the airplane may, in cases of necessity, dive directly into the net at a comparatively steep angle; the net then breaking the fall with little or no damage to itself or to the machine. However, in actual practice, in the majority of cases the relative speed at which landing is effected may be small. The vessel may be steaming ahead at half the normal landing speed; and may be moving into a wind of twenty mile speed, or so; in which case the airplane may either land at a relatively small speed or may almost hover down into the net.

Thus it will be seen that, although I may prefer to use such details as herein set forth, my invention is fully embodied in the provision of a flexible resilient or resiliently supported member into which an airplane may land, especially set up on board ship.

I have proceeded to describe a preferred form of my invention in some detail in order that my invention may be fully understood; but I do not thereby limit myself to the specific and particular details herein set forth; believing my invention to be broad in its nature as applied to the general object herein set forth, viz., the provision of a means and system whereby naval airplanes may be made as effective, or more effective, in speed, fighting and maneuvering as the light fast airplanes now used on land.

Having described a preferred form of my invention, I claim:

1. An airplane landing device, embodying a flexible landing net, and horizontal side cables at the edges of the net and between which the net is stretched and upon which the net slides longitudinally.

2. In combination, a flexible landing net supported at its edges and movable longitudinally, means to retard longitudinal movement of the net, and an airplane having landing means adapted to catch in the net.

3. In combination, a flexible landing net supported at and stretched between its opposite longitudinal edges and movable longitudinally, drag weight means to retard longitudinal movement of the net, and an airplane having landing means adapted to catch in the net.

4. In combination, a flexible landing net, supporting means for the net supporting one end higher than the other, said supporting means allowing longitudinal movement of the net, means to retard the longitudinal movement of the net, and an aircraft equipped with landing means adapted to catch in the net.

5. In a device of the character described, supporting posts, longitudinal cables stretched between said posts, a flexible net mounted on and between the cables to move longitudinally on the cables, and means to retard the movement of the net.

6. In a device of the character described, an airplane having a body and wings, and a net catch hook under the body forward and aft and one under the wings on each side of the body.

7. In a device of the character described, an airplane having body and wings, and propeller, a protective skid extending longitudinally under the body and propeller and curving up forwardly before and over the propeller, and a net catch-hook on the lower part of said skid.

8. In a device of the character described, an airplane having body and wings and propeller, a protective skid extending longitudinally under the body and propeller and curving up forwardly before and over the propeller, a net catch hook on the lower part of said skid, and net catch hooks under the wings at each side of the body and under the after part of the body.

9. In a device of the character described, an airplane having body and wings and propeller, a protective skid extending longitudinally under the body and propeller and curving up forwardly before and over the propeller, and a movable net catch-hook under manual control mounted on the lower part of said skid.

10. In a device of the character described, a flexible landing net adapted to receive an airplane, longitudinal side members between which the net is stretched and with reference to which the net has longitudinal movement, and means to retard such longitudinal movement.

11. In a device of the character described, a flexible landing net adapted to receive an airplane, mounting means for the net for supporting it above a foundation, said means embodying means to stretch the net and to allow it longitudinal movement, and means to retard longitudinal movement of the net.

12. In a device of the character described, the combination of a landing net having transverse members, net supporting means between which the net is supported and with reference to which the net has longitudinal movement, means to retard the longitudinal movement of the net, and an airplane having projecting means adapted to catch and engage against the transverse net members to prevent further longitudinal movement of the airplane with reference to the net when the airplane has alighted in the net by movement longitudinal of the net.

13. In a device of the character described, the combination of a landing net having transverse members, net supporting means between which the net is supported and with reference to which the net has longitudinal movement, means to retard the longitudinal movement of the net, and an airplane having means projecting below its frame and adapted to catch and engage against the transverse net members to prevent further longitudinal movement of the airplane with reference to the net when the airplane has alighted in the net by movement longitudinal of the net, said net engaging members being situated one fore and one aft on the airplane frame and embodying downwardly and forwardly projecting hooks adapted to catch against and under the transverse members to prevent the airplane rising from the net at the rear.

14. An airplane landing device, embodying a pair of longitudinal side members, a flexible net supported between and movable longitudinally on the side members, and means to retard longitudinal movement of the net.

In witness that I claim the foregoing I have hereunto subscribed my name this 4th day of October, 1917.

FLOYD SMITH.

Witnesses:
V. BERINGER,
JAMES T. BARKELEW.